Sept. 22, 1970   F. H. STITES ET AL   3,530,434
CODED FREQUENCY VEHICLE IDENTIFICATION SYSTEM
Filed June 14, 1967   4 Sheets-Sheet 1

INVENTORS
ELTON E. DUNBAR
FRANCIS H. STITES
BY
ATTORNEY

United States Patent Office 3,530,434
Patented Sept. 22, 1970

3,530,434
CODED FREQUENCY VEHICLE IDENTIFICATION SYSTEM
Francis H. Stites, Wayland, and Elton E. Dunbar, Waltham, Mass., assignors to Sylvania Electric Products Inc., a corporation of Delaware
Filed June 14, 1967, Ser. No. 645,943
Int. Cl. H04q; H04m 11/02; H02b 1/00
U.S. Cl. 340—149                                11 Claims

ABSTRACT OF THE DISCLOSURE

An electromagnetic vehicle identification system in which a low power transmitter carried by a vehicle to be identified continuously emits a coded frequency multiplex signal which is received by a way side receiver as the vehicle passes a wayside station. The received signal is decoded to ascertain the identity of the vehicle. The coded format is binary coded decimal plus odd parity and is generated by selectively combining several oscillator tones to form the multiplex signal.

BACKGROUND OF THE INVENTION

This invention relates to object identification systems and in particular to electromagnetic systems particularly useful for identifying transportation vehicles.

Various automated systems for identifying transportation vehicles have been developed using electromagnetic radiation as a means of communication between a vehicle to be identified and the identifying system. Such systems generally employ a transmitter, located at a wayside station, that radiates energy to the vehicle, and a passive transponder mounted on the vehicle that reradiates the transmitted energy in a coded form to a wayside receiver. The transponder generally comprises a series of tuned crystals or oscillators which respond to the transmitted signal by reradiating the transmitted signal at particular frequencies representing the coded information. This type of system has two major inherent disadvantages; the wayside transmitter and receiver must be isolated from each other so that the wayside receiver is not blocked during transmission, and the transmitter output power must be sufficiently high to overcome the losses present in the two way transmission path, as well as the losses in the passive transponder. It is possible to obtain a degree of isolation between the transmitter and receiver by judicious placement of their respective antennas at the interrogating station to reduce the coupling therebetween. However, some coupling will always exist, especially where the antennas operate over a range of several frequencies. The transmitter power cannot always be increased sufficiently to overcome system losses since the power level must usually be within an upper limit set by the Federal Communications Commission. It would be advantageous to have and it is the object of the invention to provide a vehicle identification system wherein the transmitter/receiver isolation problem is eliminated or substantially reduced and wherein the transmitter operates at relatively low power ouput.

SUMMARY OF THE INVENTION

In accordance with the present invention, a low power transmitter is mounted on a vehicle to be identified and a receiver is located at a wayside station along the route of the vehicle. In a typical application of the invention, a transmitter is mounted on each bus operating in a city transit system and the automatic identification of particular buses as they pass receiving stations along their route is used dispatching and maintaining control of the buses within the transit system. Each transmitter generates a coded signal representing its vehicle identity, and this signal is continuously radiated as the vehicle travels on its route. The coded signal is generated by selectively combining the signals from a plurality of oscillators to form a binary coded decimal signal containing the requisite information including parity. As the vehicle passes a wayside receiver, the radiated signal is received and decoded to ascertain the vehicle identity. Problems of isolation between the transmitter and receiver and path losses suffered by conventional systems are minimized in the instant invention by employing one-way transmission from an active transmitter on the vehicle to a receiver at a wayside point. Since one-way transmission is employed, the transmission path losses are inherently lower than in conventional two-way transmission systems, and transmitter/receiver isolation is achieved by the remote deployment of the transmitter and receiver relative to each other.

The present vehicle identification system, as any sensitive information system, must function in the presence of noise emanating from the background and from other vehicles operating within the system. Most of the background noise that exists at the receiver prior to the passing of a vehicle is excluded by maintaining a high threshold level at the receiver and also by use of narrow band filters in the receiver. When a vehicle to be identified is passing the wayside unit, the transmitted signal overcomes a threshold level in the receiver and is processed by a decoding unit. To preclude noise and weak signals from other vehicles within the identification system from entering the decoding unit during the receipt of a valid signal, an automatic gain control (AGC) signal is generated from the valid signal which is operative to raise the receiver threshold such that only the stronger signal from the desired vehicle will be processed.

BRIEF DESCRIPTION OF THE DRAWINGS

The invention will be more fully understood from the following detailed description, taken in conjunction with the accompanying drawings in which.

DETAILED DESCRIPTION OF THE INVENTION

System operation

Figure 1:
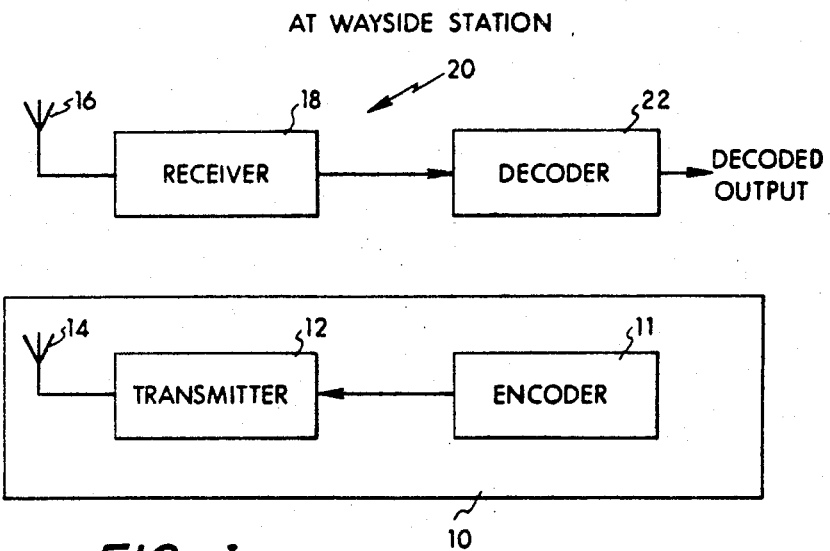
FIG. 1 is a block diagram of a vehicle identification system according to the invention.

Referring to FIG. 1, a vehicle 10 or other object to be identified has mounted thereon a transmitter 12, an encoder 11 and an antenna 14. Encoder 11 selects, in accordance with predetermined information such as an identification number, one or more frequencies from a group of frequencies generated in transmitter 12, the selected frequencies being combined in the transmitter to form a frequency-coded signal which represents the chosen information and which is continuously radiated by antenna 14 as the vehicle travels along its route. The transmitter typically operates in a frequency range near 200 kHz. and is of sufficiently low power to obviate the need for radio station licensing by the Federal Communications Commission.

As the vehicle passes a wayside station along the route, the radiated signal is intercepted by an antenna 16, detected by a receiver 18 and decoded by decoder 22 to ascertain the data content of the received signal. The decoded output signal can then be applied to a utilization device such as a teletypewriter which may be located at the wayside station or at a remote point, for example, a central control center.

Code

The particular code employed in the instant invention is a binary coded decimal (BCD) code with odd parity wherein binary numbers are assigned to each decimal digit. To represent the digits zero through nine and a "START" digit, four binary bits are required and the encoded digits with a parity bit are listed in Table 1.

TABLE 1

| Decimal Digit | Binary | | | | | Decimal Digit | Binary | | | | |
|---|---|---|---|---|---|---|---|---|---|---|---|
| | 1 | 2 | 4 | 8 | P | | 1 | 2 | 4 | 8 | P |
| 1 | 1 | 0 | 0 | 0 | 0 | 6 | 0 | 1 | 1 | 0 | 1 |
| 2 | 0 | 1 | 0 | 0 | 0 | 7 | 1 | 1 | 1 | 0 | 0 |
| 3 | 1 | 1 | 0 | 0 | 1 | 8 | 0 | 0 | 0 | 1 | 0 |
| 4 | 0 | 0 | 1 | 0 | 0 | 9 | 1 | 0 | 0 | 1 | 1 |
| 5 | 1 | 0 | 1 | 0 | 1 | 0 | 0 | 1 | 0 | 1 | 1 |
| | | | | | | START | 1 | 0 | 1 | 1 | 0 |

The party bit is added to the binary code where there are an even number of "ONE" bits representing the decimal. For example, the binary code for the decimal "3" is 1100 so a bit is added in the parity column to maintain an odd number of "ONES." Thus, with parity added, the decimal "3" becomes 11001. As in most coding schemes, the parity bit is only used to verify the data in the decoding logic and is not read out of the system. The technique employed to generate the BCD code is that of frequency multiplexing wherein each of the four binary bits and the parity bit are assigned separate frequencies which are multiplexed prior to being transmitted.

Transmitter subsystem

Figure 2:
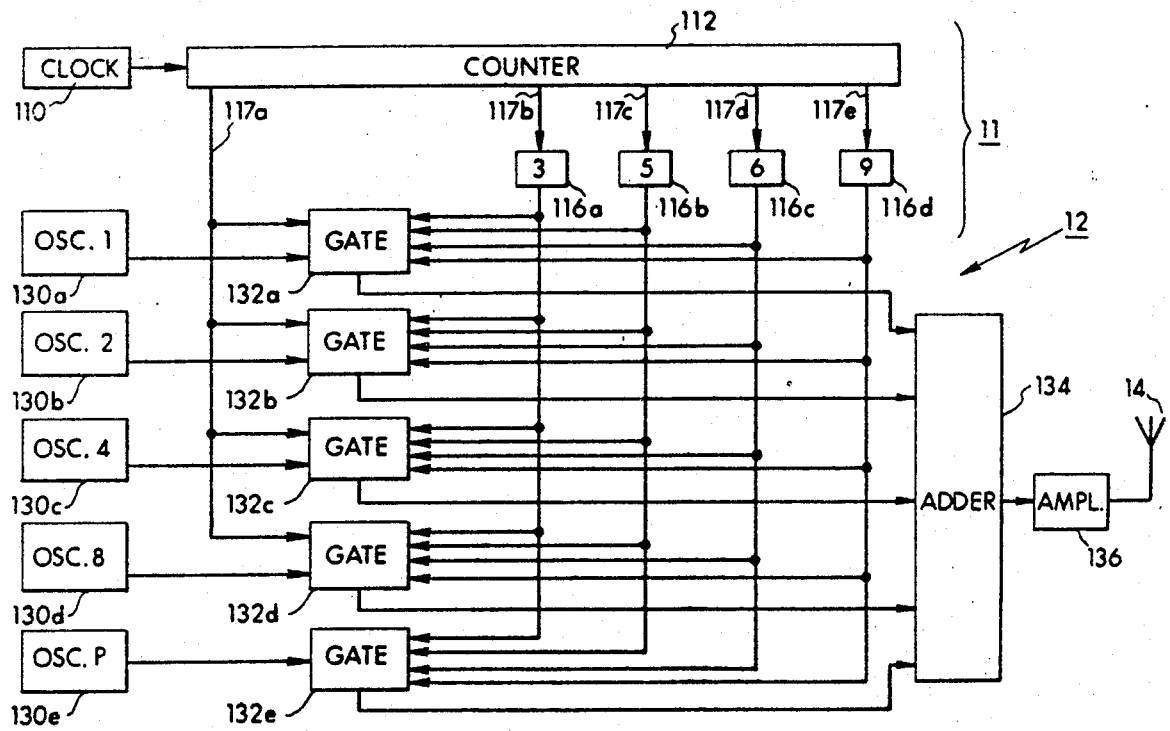
FIG. 2 is a block diagram of a transmitter employed in the present invention.

The active transmitter unit carried by vehicle 10 is shown in block diagram form in FIG. 2. Transmitter 12 comprises five oscillators 130a–130e each tuned to a separate frequency and each connected to a respective gate 132a–132e, the outputs of which are coupled by means of an adder circuit 134 and an amplifier 136 to transmitting antenna 14. The gates are controlled by encoder 11 which includes a counter 112 driven by a clock 110, the output 117a of the counter being connected to gates 132a, 132c and 132d, and the outputs 117b–117e being connected, via respective manually operated switches 116a–116d, to gates 132a–132e. It will be appreciated that the five oscillators and five gates correspond to the five bit positions of the coded digits. Particular coded digits are generated by gating on those gates associated with the oscillators which are needed for the particular digit.

Figure 3:
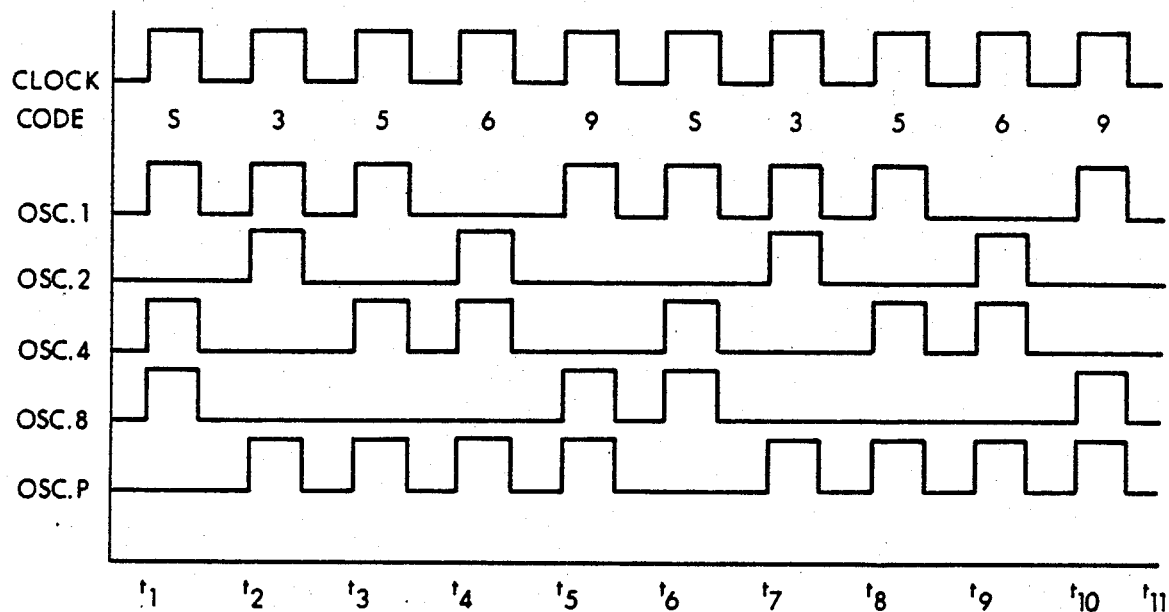
FIG. 3 is a plot of waveforms useful in understanding the operation of the invention.

The operating sequence of the circuit of FIG. 2 is best explained with reference to Table 2 and the timing diagrams of FIG. 3.

TABLE 2

| Switch Setting | Oscillators | | | | |
|---|---|---|---|---|---|
| | 130a | 130b | 130c | 130d | 130e |
| 1 | 1 | 0 | 0 | 0 | 0 |
| 2 | 0 | 1 | 0 | 0 | 0 |
| 3 | 1 | 1 | 0 | 0 | 1 |
| 4 | 0 | 0 | 1 | 0 | 0 |
| 5 | 1 | 0 | 1 | 0 | 1 |
| 6 | 0 | 1 | 1 | 0 | 1 |
| 7 | 1 | 1 | 1 | 0 | 0 |
| 8 | 0 | 0 | 0 | 1 | 0 |
| 9 | 1 | 0 | 0 | 1 | 1 |
| 0 | 0 | 1 | 0 | 1 | 1 |
| START | 1 | 0 | 1 | 1 | 0 |

The first column of Table 2 indicates the possible numerical setting for each of the four manual entry switches 116a–116d and the next five columns indicate the binary values of oscillators 130a–130e, the oscillators 130a–130d representing data bits assigned decimal values 1, 2, 4 and 8 respectively, and oscillator 130e representing a parity bit. The START code is wired directly to gates 132a, 132c and 132d as this code is always transmitted.

Assume that a vehicle identification is to be transmitted. This number is manually set into the mechanical switches 116a–116d, respectively, the switches being wired to gates 132a–132e such that a particular switch setting will interconnect those gates representing the encoded version of the number corresponding to the setting of the switch. At a time $t_1$, the START code 10110 is generated by means of clock 110 which applies a pulse via counter 112 and output line 17a to gates 32a, 132c and 132d. These gates are operative for a specified period, typically four milliseconds, to allow the output signals from oscillators 130a, 130c and 130d to be applied to an adder 134 where they are multiplexed and, after suitable amplification in amplifier 136, radiated by antenna 14. This START signal is employed in the decoding circuitry (to be discussed hereinafter) to validate the presence of a true data signal.

At a time $t_2$, another clock pulse is supplied by clock 110 to counter 112 and is directed to switch 116a via the counter output terminal 117b. By virtue of the switch wiring, the number "3" switch setting allows input pulses to be simultaneously transferred to gates 132a and 132b, allowing oscillators 130a and 130b to apply their respective signals to adder 134 for multiplexing prior to transmission to the wayside unit. The signal thus produced is of decimal value 3 since oscillators 130a and 130b are assigned respective decimal values 1 and 2 which combine to provide the decimal value of 3. A third input to adder 134 is supplied by the oscillator 130e via gate 132e, to provide a parity bit. As stated hereinabove, an odd parity code is employed which requires that the transmitted pulse train be composed of an odd number of "ONES" which, of course, are represented by oscillator (or binary) pulses. As seen in FIG. 3, oscillator 130e, the parity oscillator, is only used when an even number of oscillators 130a–130d are employed to form the desired binary value. Each composite pulse that is transmitted to the wayside unit will be composed either of a single oscillator output or a combination of three oscillator outputs corresponding to one or three bits. Referring again to FIG. 3, at $t_3$ output 117c of counter 112 supplies an output pulse to gates 132a, 132c and 132e which, in turn, gate the output of oscillators 130a, 130c and 130e, respectively, to adder 134. As oscillators 130a and 130c are assigned decimal values of 1 and 4 respectively, the composite signal has the desired decimal value of 5. Again, since there is an even number of oscillators used, a parity bit is supplied by oscillator 130e. At time $t_4$, counter output 117d supplies an output pulse to gates 132b, 132c and 132e to gate the outputs of oscillator 130b, 130c and 130e to adder 134. As oscillators 130b and 130c are assigned decimal values of 2 and 4, respectively, the composite signal has the desired decimal value of 6. Again, since an even number of oscillators are used, a parity signal is supplied by oscillator 130e. At time $t_5$, the decimal 9 is generated in the same manner as above by adding the outputs from oscillators 130a and 130d, which are assigned respective decimal values of 1 and 8. The output from the parity oscillator 130e again provides the required parity bit. The complete identification signal thus generated is continuously radiated by antenna 14 on the vehicle.

Receiver subsystem

Figure 4:
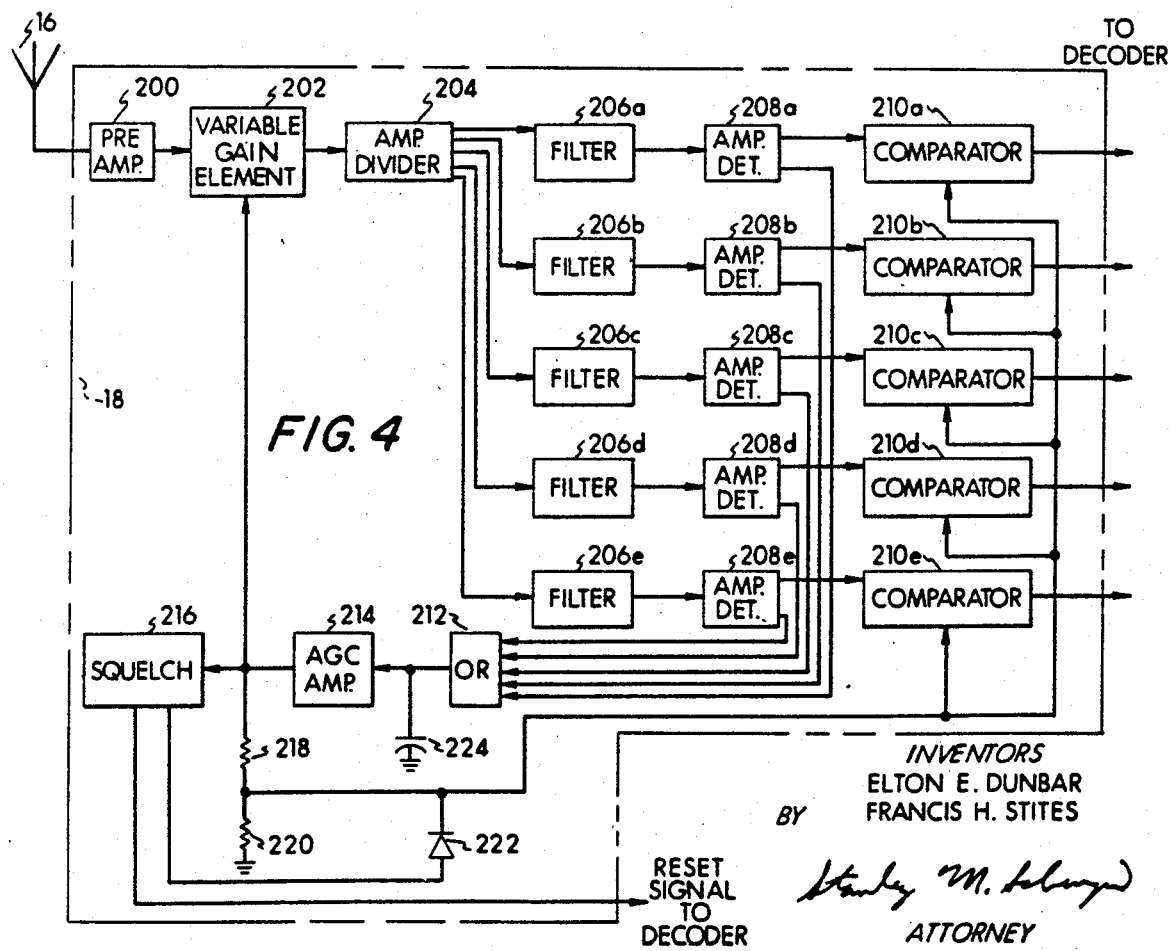
FIG. 4 is a block diagram of a receiver employed in the present invention.

When the vehicle passes a wayside unit, the transmitted signal is coupled via a tuned antenna 16 to a receiver 18, shown in FIG. 4. Receiver 18 comprises a preamplifier 200, a variable gain element 202 associated with an automatic gain control (AGC) circuit, to be discussed hereinafter, an amplifier/divider 204 that furnishes a plurality of substantially equal output signals to a plurality of tuned filters 206a–206e connected to a respective plurality of amplifier/detectors 208a–208e which, in turn, is connected to a respective plurality of comparators 210a–210e. Each of the filters and associated detectors and comparators forms a channel for corresponding ones of the transmitted frequencies. The AGC circuit is composed of an OR gate 212 which receives input signals from detectors 208a–208e, a capacitor 224 connected between the output of the OR gate and a source of reference potential such as ground, and an AGC amplifier 214 which provides a control signal, derived from the output signal from OR gate 212, to variable gain element 202. A voltage divider, consisting of two series-connected resistors 218 and 220 connected between the AGC amplifier output and a reference potential such as ground provides a reference signal to comparators 210a–210e. A squelch circuit 216 is provided in the AGC loop to prevent unwanted signals from being processed.

Filters 206a–206e are tuned to the frequencies of the transmitter oscillators 130a–130e respectively, to the exclusion of all other frequencies. The outputs of filters 206a–206e are connected to the inputs of respective amplifier/detectors 208a–208e, such that the output signals of the filters which are activated are amplified and detected prior to being directed to respective comparators 210a–210e. A second output from each amplifier/detector is connected to the input side of OR gate 212 which is operative to charge capacitor 224 to the peak value of the strongest output signal from the plurality of amplifiers/detectors. The DC voltage thus generated, and after amplification by AGC amplifier 214, is used to control variable gain element 202 which, in turn, is operative to maintain a constant output signal from the amplifier/detectors 208a–208e.

The output voltage of AGC amplifier 214 is also directed to a voltage divider comprised of the series-connected resistors 218 and 220, the junction of the two resistors being connected to a second input of comparators 210a–210e such that a fraction of the AGC signal is supplied as a reference signal to the comparators. The comparators provide a threshold level which precludes weaker signals emanating from other vehicles from entering the decoding unit 22 while receiving signals from a vehicle passing the wayside station. In the absence of an AGC signal at the output of amplifier 214, the squelch circuit 216 provides a signal via diode 222 to the comparators 210a–210e to maintain a sufficiently high threshold level to prevent spurious output signals from appearing at the comparator outputs. When the received signal generates an AGC voltage at the output of amplifier 214 of a predetermined magnitude, the squelch threshold level is removed and the comparator threshold is now set by the output AGC voltage. A second output pulse from the squelch circuit 216 is directed to the decoding unit 22 to reset the logic, as will be explained in detail hereinafter.

Decoding logic

Figure 5:
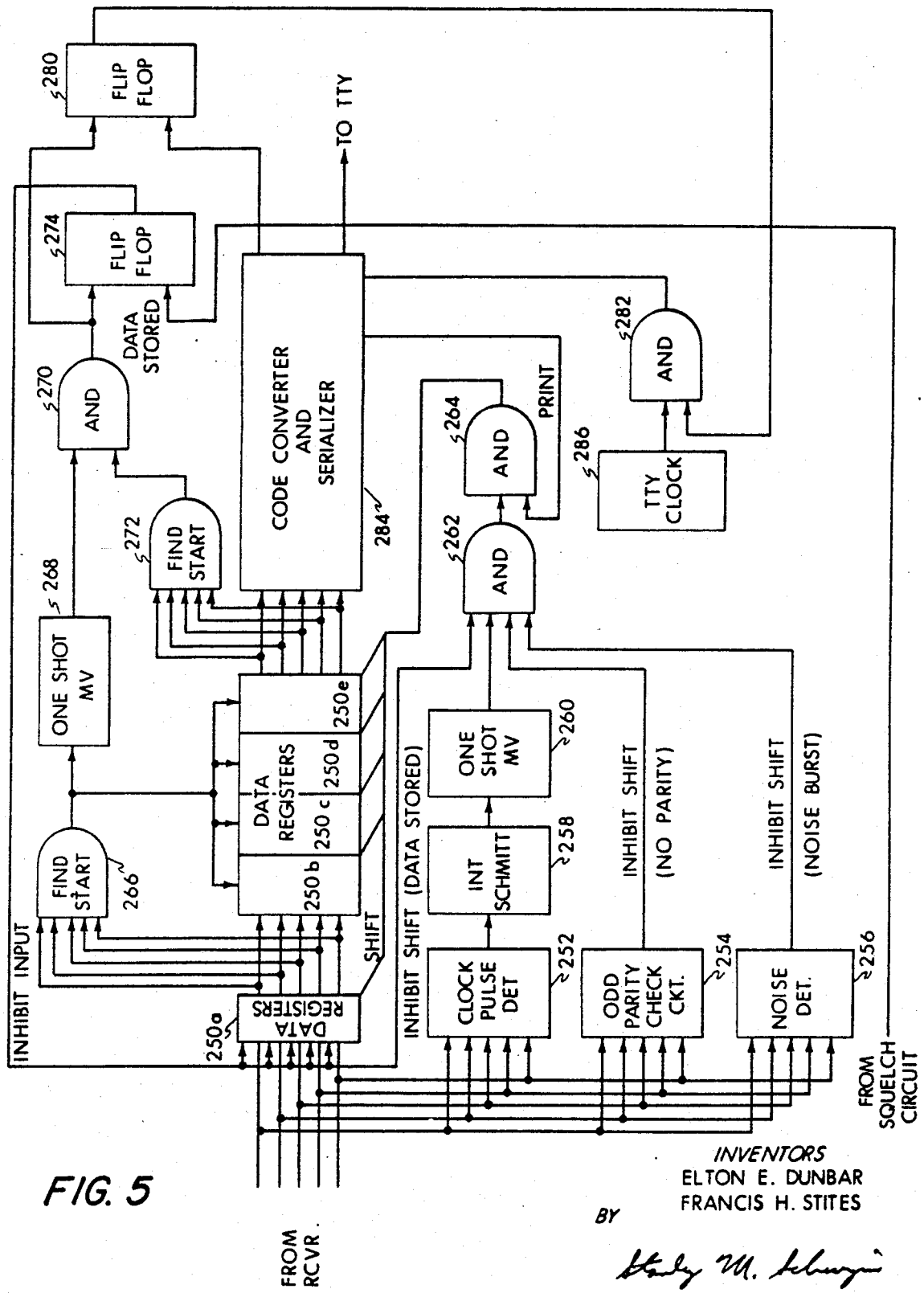
FIG. 5 is a block diagram of decoder logic employed in the present invention.

Referring to FIG. 5, the output data pulses from the receiver comparators 210a–210e are directed simultaneously to a plurality of circuits in the decoding unit 22, namely to a bank of data registers 250a, a bank of clock pulse detectors 252, a parity checking circuit 254 and a noise detector circuit 256a. The data appearing on the input lines, which are the four information bits and one parity bit, is stored in a first bank of data registers 250a. Assuming certain criteria, to be discussed hereinafter, are met, a shift pulse will be generated by a combination of a clock pulse detector 252, an integrator Schmitt 258, a one shot multivibrator 260 and two AND gates 262 and 264 to shift the data into a second bank of storage registers 250b. The shifting sequence continues in like manner until the data is stored in registers 250e. The two criteria referred to are, first, a successful vertification by an odd parity check circuit 254 and, secondly, a determination by a noise detector 256 that the signal stored in data register 250a is not noise. If the odd parity check fails or the signal is determined to be noise, the data stored in data register bank 250a will not be shifted into the second data register bank 250b. The signal stored in bank 250a will also be examined by a "Find Start" circuit 266 to determine if the stored signal is in fact the desired START signal. If a valid START signal is present, one input to an AND gate 270 is generated by a one shot multivibrator 268. When this START signal has been shifted through data register banks 250a–250d and is stored in bank 250e, it is sensed by a second Find Start circuit 272 which supplies a second input signal to AND gate 270. A flip-flop 274, when triggered by the output pulse from AND gate 270, generates an inhibit pulse which is directed to register bank 250a to prevent any further data from being loaded, and also supplies inhibit pulse to AND gate 262 to prevent the generation of shift pulses. The identification data stored in the registers is then shifted into the code converter and serializer 284 which provides an output signal suitable to operate a teletypewriter.

Considering the decoding operation in greater detail, the data pulses that exceed the threshold of comparators 210a–210e in receiver 18 are directed simultaneously to a first bank of storage registers 250a, to clock pulse detector 252, to parity checking circuit 254 and to noise detector circuit 256. The clock pulse detector is typically a five input NAND gate which functions to generate an output signal upon the presence of an input signal on any input line. This output signal is directed to an integrator 258 which, if the input signal remains for more than 2 milliseconds, causes an output strobe pulse to be generated by a one shot multivibrator 260. The 2 millisecond delay of integrator 258 precludes short noise bursts from generating a strobe pulse. The strobe pulse thus generated is one of four inputs to AND gate 262.

Figure 6:
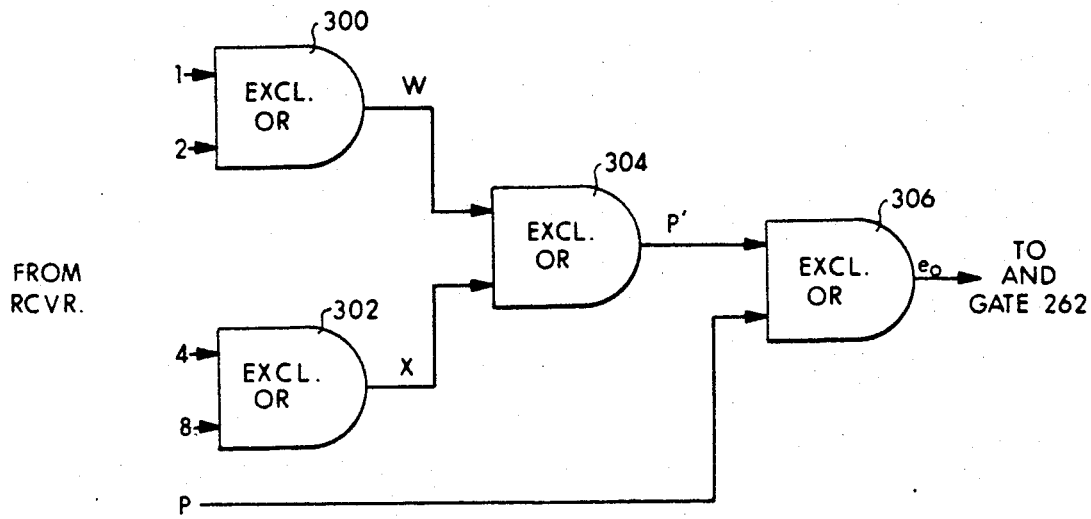
FIG. 6 is a block diagram of an odd parity checking circuit useful in the invention.

A second input to AND gate 262 is generated by parity checking circuitry 254 which is capable of receiving the information and parity data stored in the data register bank 250a. A typical parity checking circuit is shown in FIG. 6 and employs four EXCLUSIVE OR circuits 300, 302, 304 and 306, which function to generate a reference parity bit from the four information channels, to compare the parity bit thus generated with the parity bit transmitted from the vehicle and to supply a pulse to AND gate 262 only in the event there is correlation. The EXCLUSIVE OR gate 300 has as its input the data from channels 1 and 2, while EXCLUSIVE OR gate 302 has as its input the data from channels 4 and 8. EXCLUSIVE OR gate 304 receives its inputs W and X from respective gates 300 and 302, and generates a parity bit $P_1$ which is applied to one input of gate 306, the other input of which is the parity bit P transmitted from the vehicle. In the absence of correlation between the two input bits, P and $P_1$ at the input of gate 306, the requisite pulse supplied to AND gate 262 will not be generated. EXCLUSIVE OR gates 300, 302, 304 and 306 function according to the truth tables of Table 3.

TABLE 3

| A | | | B | | | C | | | D | | |
|---|---|---|---|---|---|---|---|---|---|---|---|
| 1 | 2 | W | 4 | 8 | X | W | X | P' | P | P' | $e_0$ |
| 0 | 0 | 1 | 0 | 0 | 1 | 0 | 0 | 1 | 0 | 0 | 1 |
| 0 | 1 | 0 | 0 | 1 | 0 | 0 | 1 | 0 | 0 | 1 | 0 |
| 1 | 0 | 0 | 1 | 0 | 0 | 1 | 0 | 0 | 1 | 0 | 0 |
| 1 | 1 | 1 | 1 | 1 | 1 | 1 | 1 | 1 | 1 | 1 | 1 |

To better understand the operation of the odd parity checking circuit, the processing of a number, say seven, will be described in conjunction with Table 3. In the binary coded decimal system, a seven is represented by the binary number 11100. A binary ONE is therefore present at inputs 1, 2 and 4. Therefore, EXCLUSIVE OR gate 300 will have two input ONE signals and EXCLUSIVE OR gate 302 will have a ONE and a ZERO input signals. Referring to truth tables A and B of Table 3, when both of the inputs, 1 and 2, to EXCLUSIVE OR gate 300 are ONE, the output, W, is a ONE, and when one of the inputs, 4, to EXCLUSIVE OR gate 302 is a ONE, the output, X, is a ZERO. Referring to truth table C, it can be seen with the inputs W and X, ONE and ZERO respectively, the output of EXCLUSIVE OR gate 304 will be a ZERO. The output signal $P_1$ of EXCLUSIVE OR gate 304 is then compared with the parity channel signal by EXCLUSIVE OR gate 306 which gives an output signal in accordance with truth table D. In the instant example, P is also a ZERO and the output signal directed to AND gate 262 from EXCLUSIVE OR gate 306 is a ONE, which is a requisite input for the generation of a shift pulse.

A third input signal to AND gate 262 is generated in noise detector circuit 256 which consists of a five port AND gate. The noise detector 256 thus will only have an output signal when there is a signal pulse on all five input lines. Because of the coding system chosen, the signal to be decoded can never have more than three signal channels operative at one time; therefore, the only condition whereby a signal appears in every channel simultaneously is that condition caused by noise. When this condition occurs, an inhibit signal is generated and directed to AND gate 262 to prevent a shift pulse from being generated.

The fourth input signal to AND gate 262 is an inhibit signal generated by one shot 274 when a valid START signal reaches register 250e (to be discussed in detail below). When this condition occurs, an inhibit pulse is generated by one shot multivibrator 274 and directed to AND gate 262 to prevent shift pulses from being generated by the combination of clock pulse detector 252, integrator Schmitt 258 and multivibrator 260.

While the data is stored in data register bank 250a, prior to the receipt of a shift pulse via AND gate 262, a test is made by Find Start circuit 266 to determine if the stored data is a START signal. It will be recalled that Start is designated as the binary number 10110. The Find Start circuit 266 is a five port AND gate which generates an output signal when the signal stored in register bank 250a is 10110. When the presence of a START signal is detected by the Find Start circuit 266, an output pulse is generated and directed to data registers 250b-250e and one shot multivibrator 268. The signal directed to the data register 250b-250e is used to clear the registers and the signal directed to multivibrator 268 generates a 34 millisecond delay corresponding to the length of time it takes to shift the START signal from data register bank 250a to data register bank 250e. Should another START signal appear in data register 250a before the 34 milliseconds has elapsed, multivibrator 268 will be retriggered and will commence another timing cycle.

If a valid START signal is received, it is shifted to the right and is sequentially followed by the first, second, third and fourth digits of the transmitted number which are stored in register banks 250e-250a, respectively. When the START signal reaches data register 250e, it is sensed by a second Find Start circuit 272 which then generates and directs an output signal to AND gate 270. If coincidence occurs at AND gate 270 between the output signals from one shot 268 and the Find Start circuit 272, an output signal is generated by AND gate 270 and directed to trigger flip flops 274 and 280 respectively. The output signal from flip flop 274 is directed to data register bank 250a to inhibit the loading of any new data into said bank, and to AND gate 264 to inhibit the generation of shift pulses via the clock pulse detector 252.

The output signal generated by flip flop 280 is directed to an AND gate 282 which, in turn, gates through the clock pulses from the teletypewriter clock 286 to a code converter and serializer unit 284. This is a conventional converter matrix and serializer which changes the data content of the data register banks into a standard code suitable for operation of a teletypewriter.

When the serializer stops, an output signal is directed to reset flip flop 280 which, in turn, disables AND gate 282. The inhibit signal furnished to data register 250a and to AND gate 262 remain until flip flop 274 is reset by the action of the receiver AGC level dropping below the squelch activation level. This means that once a valid identification number from a particular vehicle has been stored in the register banks 250a-250e no more data will be accepted or processed by the logic until the signal at the receiver drops below the squelch activation level. This will usually occur when the vehicle has passed beyond the wayside station. When the squelch voltage pulse reappears, flip flop 274 is reset by the leading edge of the squelch pulse thus removing the inhibit pulses from data register bank 250a and AND gate 262 and rendering the logic circuitry in a state of readiness to receive more data.

Although the invention has been described with reference to the specifics of one illustrative embodiment, it is not limited to the details of this description but embraces the full scope of the following claims.

What is claimed is:

1. For the identification of objects in motion past a wayside station, an electromagnetic system comprising:
   an active transmitting means associated with an object to be identified and operative to continuously radiate a frequency coded signal representing the identification of said object, said transmitting means including an encoding means comprising,
      clock means operative to produce a continuous pulse train,
      counter means having a plurality of output terminals and being operative in response to the pulse train from said clock means to sequentially provide an output pulse from each of said output terminals of said counter means,
      a plurality of switching means operative to select information to be coded and to selectively direct according to said information said output pulses from said counter means,
      a plurality of oscillators operative to continuously generate output signals each at a separate frequency,
      an adder circuit, and
      a plurality of gating means operative in response to said counter means output pulses to selectively apply said oscillator output signals to said adder circuit,
      said adder circuit being operative to provide a composite signal pulse train composed of said output signals;
   receiving means positioned at said wayside station and being operative to receive said frequency coded signal representing the identification of said object; and
   means for decoding the data content of said frequency coded signal.

2. The invention according to claim 1 wherein said frequency coded signal is in a binary coded decimal format with odd parity.

3. The invention according to claim 1 wherein said receiver means comprises:
   amplifier/divider means operative to amplify said composite signal and to divide said composite signal into a plurality of substantially equal amplitude output signals;
   a plurality of filters each operative in response to a respective one of said plurality of divided composite signals to select one oscillator output signal;
   a plurality of amplifier/detector means each operative to amplify and detect the output signal, if any, of a respective filter and to supply a first and second output signal;
   an OR circuit operative in response to said first output signal from each of said plurality of amplifier detectors;
   integrator means operative to convert the highest output signal of said OR circuit to a DC voltage;

amplifier means operative to receive and amplify said DC voltage from said integrator;

variable gain means operative in response to said amplified DC voltage to adjust the gain of said composite signal;

a voltage divider operative in response to said amplified DC voltage to provide a reference voltage; and a plurality of comparators operative to compare said reference voltage signal with said second output signal from its respective amplifier/detector and to generate pulses of substantially equal amplitude representing the coded signal.

4. The invention according to claim 3 wherein said receiver further includes squelch means operative in response to said amplified DC voltage signal to supply a bias signal to said comparators and to supply a reset signal to said decoding means when said amplified DC voltage falls below a predetermined value.

5. The invention according to claim 4 wherein said squelch means includes a flip flop operative to sense said amplified DC signal and to generate a bias signal at said comparator when said amplified DC signal falls below a predetermined level.

6. The invention according to claim 1 wherein said decoding unit includes:

a plurality of banks of data registers operative to store coded data from said receiving means;

a shift pulse generator operative to receive said coded data and to generate a series of shift pulses necessary to shift said data within said banks of data registers;

first "Find Start" means operative to sense when a Start signal is stored in the first bank of said data registers and operative to generate an output signal;

first delay means operative in response to the output signal of said first Find Start means to generate an output pulse;

second Find Start means operative to generate an output pulse when said Start signal reaches the last bank of said data registers;

first gating means operative to generate an output pulse upon the coincidence of said output pulses from said first delay means and second Find Start means;

a first flip flop operative in response to said output pulse from said first gating means to generate an output pulse operative to inhibit said first bank of data registers from receiving and shifting coded data;

second clock means operative to generate a clock pulse at a teletypewriter rate;

a second flip flop operative to generate an output pulse in response to the output signal from said first gating means;

second gating means operative to generate an output pulse in response to a coincidence of the output signals from said second clock means and from said second flip flop; and code converter means operative in response to the output signal of said second gating means to convert said coded data stored in said plurality of banks of data registers to a teletypewriter code and to generate a reset pulse operative to reset said second flip flop.

7. The invention according to claim 6 further including an odd parity checking circuit operative in response to said coded data to generate a first pulse for inhibiting said shift pulse generator in the event that said coded data is not composed of an odd number of pulses.

8. The invention according to claim 7 further including a noise detector operative in response to said coded data to generate a second inhibit pulse to inhibit said shift pulse generator when a binary one appears in each of the data registers.

9. The invention according to claim 8 wherein said shaft pulse generator comprises:

a clock pulse detector operative to generate an output pulse in response to any input signal from said receiving means;

an integrator Schmitt circuit operative to generate an output pulse when the width of the input signal from said clock pulse generator exceeds a predetermined width;

second delay means operative to generate an output pulse in response to the output pulse from said integrator Schmitt;

third gating means operative in response to the output pulse of said second delay means and from said odd parity checking circuit to generate an output pulse in the absence of an inhibit pulse from said noise detector or from said first flip flop; and fourth gating means operative to generate a shift pulse in response to either the output pulse of said third gating means or the output pulse from said code converter means.

10. The invention according to claim 9 wherein said clock pulse detector is a five port OR gate operative to produce an output signal in response to any or all of the signals from said receiving means.

11. The invention according to claim 8 wherein said noise detector is a five port AND gate operative to generate an output pulse when a binary one appears on all input parts thereof.

References Cited

UNITED STATES PATENTS 3,273,128    9/1966    Ruthazer.
3,378,817    4/1968    Vitt _____ 340—171

OTHER REFERENCES

"Electronics," April 1954, Frequency Code Telemetering System, H. B. Schultheis, Jr., pp. 172–176 inc.

HAROLD I. PITTS, Primary Examiner

U.S. Cl. X.R.

325—29; 340—164, 171, 311